Nov. 1, 1949.　　　　W. B. DULANEY　　　　2,486,524
V-BELT VARIABLE SPEED DRIVE
Filed Jan. 27, 1948　　　　　　　　　　　　4 Sheets-Sheet 1

INVENTOR
WILLIAM B. DULANEY
BY
Toulmin & Toulmin
ATTORNEYS

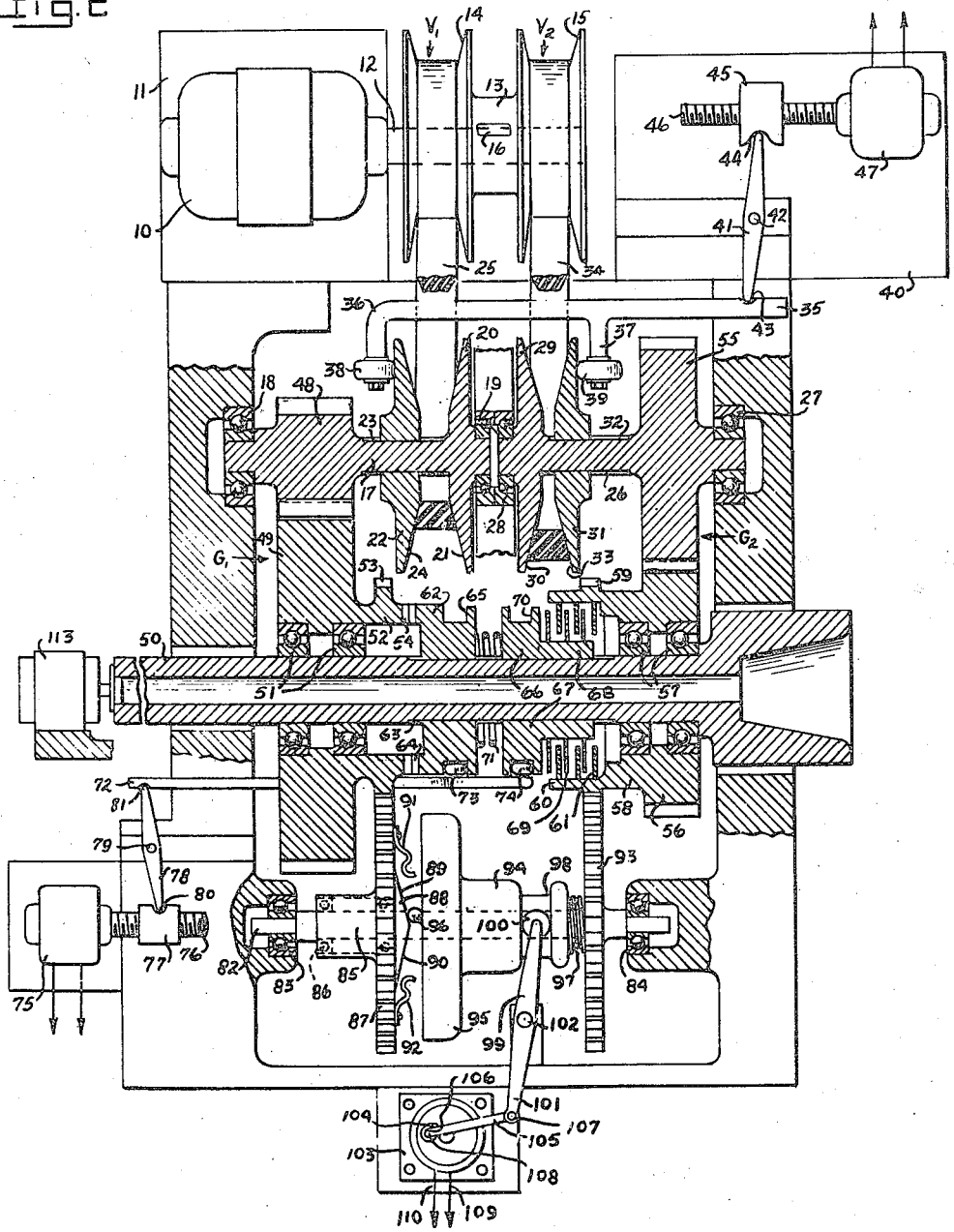

Nov 1, 1949.  W. B. DULANEY  2,486,524
V-BELT VARIABLE SPEED DRIVE
Filed Jan. 27, 1948  4 Sheets-Sheet 3

INVENTOR
WILLIAM B. DULANEY
BY
Toulmin & Toulmin
ATTORNEYS

Nov 1, 1949.  W. B. DULANEY  2,486,524
V-BELT VARIABLE SPEED DRIVE

Filed Jan. 27, 1948  4 Sheets-Sheet 4

INVENTOR
WILLIAM B DULANEY
BY
Toulmin & Toulmin
ATTORNEYS

Patented Nov. 1, 1949

2,486,524

UNITED STATES PATENT OFFICE 2,486,524

V-BELT VARIABLE-SPEED DRIVE

William B. Dulaney, Madeira, Ohio, assignor to The Cleveland Automatic Machine Co., Norwood, Ohio, a corporation of Ohio Application January 27, 1948, Serial No. 4,690

17 Claims. (Cl. 74—339)

The present invention relates to variable speed transmissions and is concerned primarily with a transmission which will accord an infinite number of speed variations over its complete range.

At the present time, transmissions for transferring power to machines for the purpose of operating them are used in widely varying fields. The performance which is required of a variable speed transmission depends largely on the character of the machine to which it transmits power. While for many machines a simple change gear speed transmission will afford satisfactory results, there are other machines which require a greater range in their operating speeds. A good example of the latter type of machine is the class of machine tools.

Substantially all machine tools include a spindle which should be operable at various speeds depending on the condition of work which is being performed. This factor is now well recognized by the machine tool industry and there is a noticeable trend in this field to provide transmissions which afford greater and greater variations in the speed at which the spindle may be driven. However, this trend is generally marked by the use of the change gear type of transmission which can afford only a fixed number of speed variations. The greater the number of variations provided the more complex is the transmission.

The use of the so-called "V-belt drive" has also been indicated as presenting possibilities in this art because such a drive affords an infinite number of speed variations over its range. However, this range is fairly limited and because of this fact it has been proposed to combine a change gear type of transmission with a V belt drive to afford a greater number of speed variations.

So far, the devices which have been designed along this principle have not proven satisfactory because they do not provide a continuous, evenly graduated chain of variations over a range sufficiently great for the use of the modern machine tool under practical conditions. Thus, with the devices now available, it is necessary to shift gears as one operation and then vary the mechanical advantage offered by the V belt drive as a second and independent operation.

With the above noted background in mind, the present invention has in view as its foremost object the provision of a transmission of the character above indicated which is effective to provide an infinite number of speed variations over a range that is sufficient to accommodate the practical working conditions of the machine which it is intended to operate.

More in detail, the invention has as an object the provision of a variable speed transmission of the type aforesaid which consists essentially of a novel combination of a V belt drive with a change gear mechanism to achieve the desired result.

In carrying out this idea in a practical embodiment, a pair of V belt drives are combined with a pair of gear trains of different ratio and the adjustment of one V belt drive is tied up with that of the other so that as the mechanical advantage afforded by one increases, the other decreases and vice versa. Likewise, a clutch is provided which is effective on one or the other of the gear trains so as to render one operable to the exclusion of the other. The shifting of this clutch is tied up with the adjustment of the V belt drives so that when one drive is adjusted to one limit of its speed, at which time the other will be adjusted to its opposite limit, the clutch is shifted to change the power transmission from one gear train to the other.

Another highly important object of this invention is the provision in a variable speed transmission of the type indicated of a pair of V belt drives that are adapted to achieve a condition of synchronous operation when one drive is operating at its maximum speed and the other drive at its minimum speed. When this point of synchronous operation is reached, the clutch is shifted and changes the power transmission from one drive to the other.

More in detail, the invention has as an object the provision of a variable speed transmission including a pair of V belt drives and a pair of gear trains with an associated clutch and a means for adjusting the drives and clutch so that as the speed of one drive rises from its lowest point the speed of the other decreases from its maximum and this variation continues until synchronous speed is reached. At that time, the power transmission shifts from one to the other and the speed of the first drive then decreases while the speed of the second drive increases.

Another somewhat more detailed object of the invention is the provision in a variable speed transmission of the character aforesaid of means for automatically interrelating the operation of the mechanism which adjusts the variable speed drives with the means which shifts the clutch for the gear trains. It is important that these two mechanisms operate in properly timed relation to afford the desired results.

Various other more detailed objects and advantages of the invention such as arise in connection with carrying out the above noted ideas in a practical embodiment will in part become apparent and in part be hereinafter stated as the description of the invention proceeds.

The invention therefore comprises a variable speed transmission that is effective to afford an infinite number of speed variations over a wide range and which consists essentially of a pair of adjustable V belt drives, means for interrelating the adjustment of the two drives, a pair of gear trains operatively connected to said drives, a clutch that is shiftable to render one gear train effective to the exclusion of the other, and means for automatically tieing up the operation of the adjusting means for the V belt drives with the shifting of the clutch.

For a full and more complete understanding of the invention, reference may be had to the following description and accompanying drawings wherein:

Figure 2 is a view somewhat similar to Figure 1 bringing out a differently adjusted position.

Figure 1:
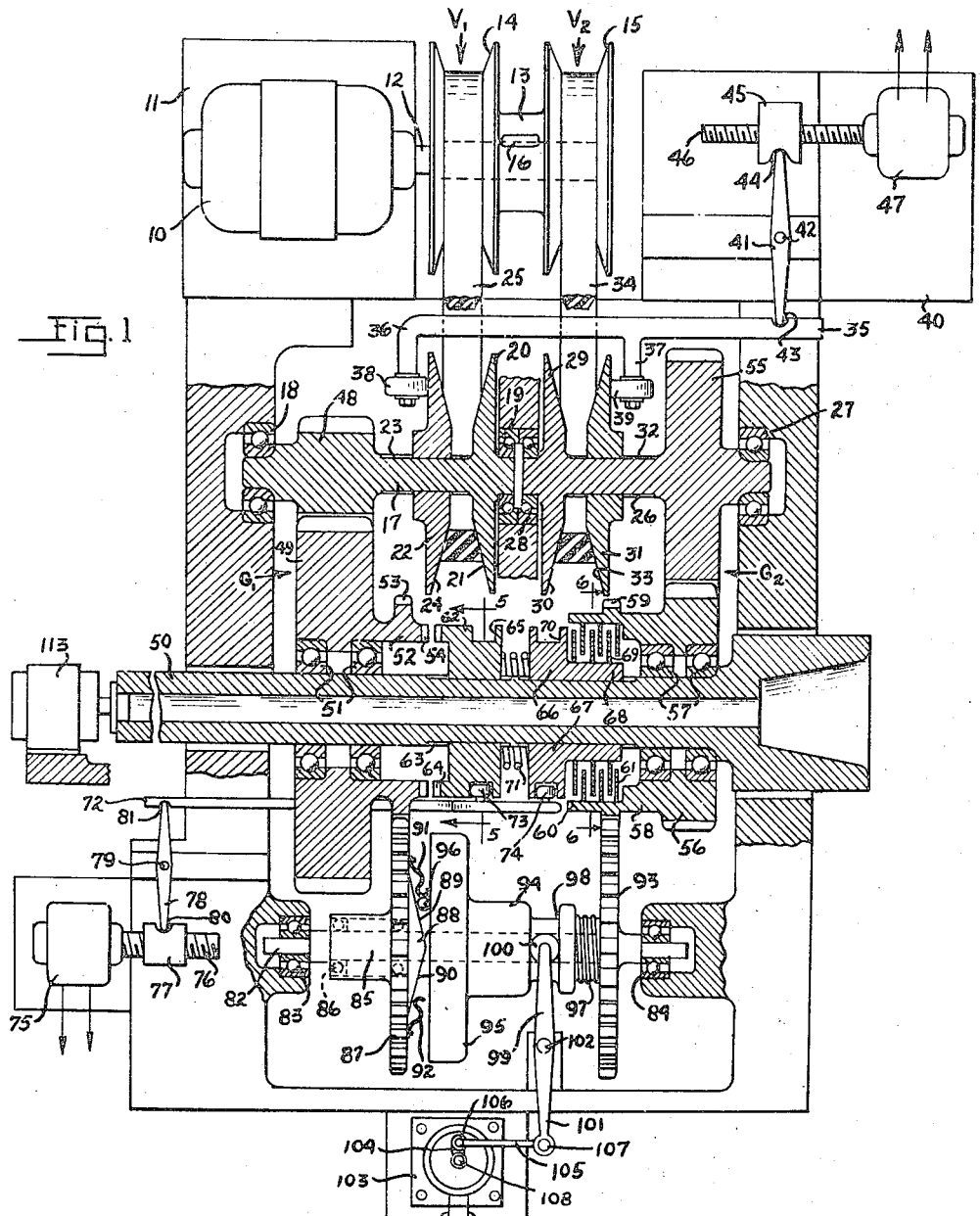
Figure 1 is a plan view, somewhat diagrammatic, of a variable speed transmission designed in accordance with the precepts of this invention. In this view is depicted one condition of the V belt drives.
Figure 3:
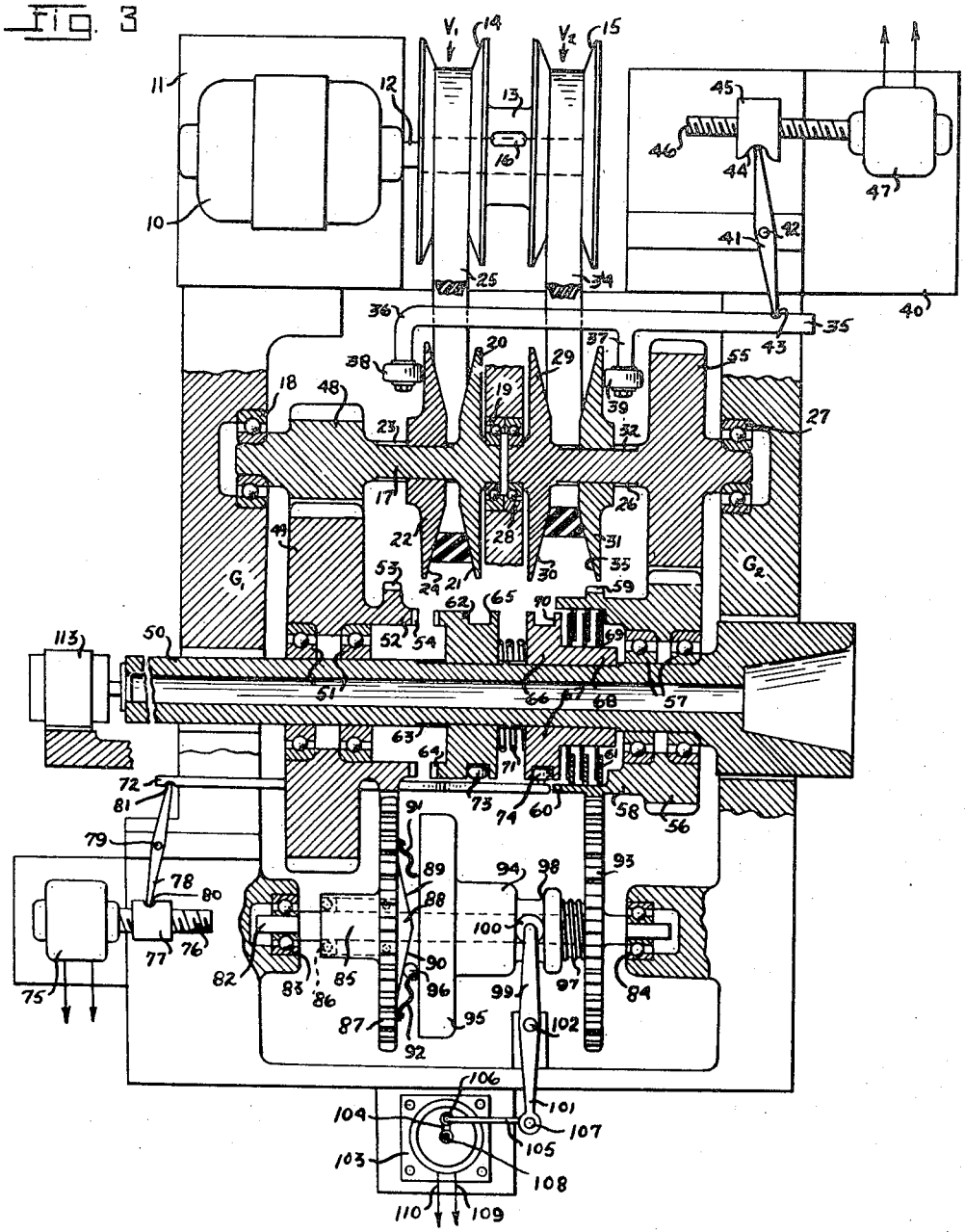
Figure 3 is still another view similar to Figures 1 and 2 illustrating still another adjusted position of the transmission.

Referring now to the drawings wherein like reference characters denote corresponding parts and first more particularly to Figures 1, 2 and 3, a source of power which is to be transmitted by the variable speed transmission hereof is represented by the electric motor at 10. This motor may be mounted on any appropriate support such as that represented at 11 and will be the type of motor which is suitable to provide the power characteristics required. The motor 10 includes a drive shaft 12 that extends outwardly from one end thereof in the manner illustrated.

A V belt drive is referred to in its entirety by the reference character $V_1$ and a second V belt drive is designated generally $V_2$. A sheave assembly comprising a hub 13 and sheaves 14 and 15 is drivably mounted on the shaft 12 in any preferred manner such as by the key shown at 16. It will be noted that in this assembly the hub 13 and the sheave halves immediately contiguous thereto are formed as a single integral unit that is slidable on the shaft 12. It is notable that the sheave 14 is one element of the V belt drive $V_1$ while the sheave 15 constitutes the corresponding element in the V belt drive $V_2$. Each of these sheaves 14 and 15 has the V cross-section illustrated.

Included as a part of the drive $V_1$ is a shaft 17 that is journaled at its opposite ends in the supporting structure by the bearing assemblies represented at 18 and 19, respectively. The inner end of the shaft 17 has mounted thereon in fixed relation with respect thereto, such as by being formed integrally therewith, a sheave half 20 that presents an inner conical face 21. A second sheave half 22 is slidably mounted on the shaft 17 but in driving relation with respect thereto. This mounting of the sheave half 22 on the shaft 17 may be accomplished by the splined arrangement represented at 23. The sheave half 22 has an inner face 24 that is opposite and complemental to the face 21. It is evident that the sheave halves 20 and 22 together define a sheave of V cross-section which may be varied by sliding the half 22 along the shaft 17. A belt 25 of V cross-section passes over the sheaves 14 and 20—22.

Included as a part of the drive $V_2$ is a shaft 26 that corresponds to and is in axial alignment with the shaft 17. This shaft 26 is journaled in the supporting structure by the bearing assembly 27 at its outer end and the bearing assembly 28 at its inner end. Adjacent to the assembly 28 the shaft 26 carries in fixed relation with respect thereto a sheave half 29 which may be mounted thereon in any preferred manner such as by being formed integrally therewith. This sheave half 29 presents an inner conical face 30. A second sheave half 31 is slidably mounted on the shaft 26 and in driving relation with respect thereto such as provided by the spline shown at 32. This sheave half 31 has an inner face 33 that is opposite and complemental to the face 30. It is evident that the sheave halves 29 and 31 together define a sheave of V cross-section that is adjustable due to the sliding action of the half 31 on the shaft 26. A V belt 34 is positioned over the sheaves 15 and 29—31.

In order for the V belt drives $V_1$ and $V_2$ to function in the manner intended, it is necessary that as the speed of one increases the speed of the other will decrease and vice versa. It is evident that the speed offered by the drive $V_1$ depends on the distance between the sheave halves 20 and 22 and the cross-sectional area of the sheave 14. As this distance increases the speed rotation offered to the shaft 17 will increase and vice versa. The same holds true for the speed of the drive $V_2$ on the shaft 26. As the distance between the sheave halves 29 and 31 increases the speed of rotation imparted to the shaft 26 will increase.

In order that the device function in the manner intended, it is necessary that as the effective speed of the drive $V_1$ increases, the effective speed of the drive $V_2$ decreases and vice versa. This means that as the distance between the sheave halves 20 and 22 becomes greater, the distance between the sheave halves 29 and 31 should correspondingly decrease and vice versa. Moreover, this variation in the effective cross-sectional area of sheave 20—22 and 29—31 is accomplished by similarly interrelated changes in the sheaves 14 and 15. As sheave halves 20—22 contract they place a tension on belt 25. This causes an expansion of sheave 14. This action is accommodated because at the same time sheave 29—31 is expanding meaning that sheave 15 must contract. This is accomplished by the adjusting mechanism now to be described.

A rod 35 is mounted for sliding action in the supporting structure in any appropriate manner. This detail has not been illustrated as it may be accomplished in any suitable way which is not a part of the invention. Outstanding from the rod 35 are a pair of arms 36 and 37. It will be noted that the arm 36 is on the outside of the sheave half 22 while the arm 37 is on the outside of the sheave half 31. The arm 36 carries a roller 38 which engages the outer flat surface of the sheave half 22 while the arm 37 carries a roller 39 engaging the outer flat surface of the sheave half 31.

Part of the supporting structure for the transmission is represented at 40. A lever 41 is pivotally mounted as indicated at 42 on the support 40 and one end of this lever is received in a notch 43 formed in the rod 35. The other end of the lever 41 is received in a notch 44 formed in a traveling nut 45. The latter is held against rotation in any preferred manner and passing therethrough is a screw stem 46 which is in threaded engagement with the nut 45. The screw stem 46 is driven by a motor 47 that is further identified as being the pulley pitch actuator motor.

It is evident that as the motor 47 is operated, the screw stem 46 is rotated. This causes a lateral shifting of the nut 45 which movement is in turn transmitted to the lever 41 to actuate the rod 35 so as to shift the latter laterally in a direction substantially parallel to the axes of the shafts 17 and 16. Depending on the direction of movement of the rod 35, the rollers 38 and 39 will be moved so that as one is moved inwardly the other is moved outwardly and vice versa.

It is notable that when either of the rollers 38 or 39 moves either of the sheave parts 22 or 31 inwardly the movement is a positive incident of the engagement of the roller 38 with the outer flat face of the respective sheave half. However, when either of these rollers move outwardly, it does not actually move the sheave half but permits the movement which is caused by the wedging engagement of the V belt with the respective sheave half. In this connection it is noted that the sheave halves 22 and 31, while interconnected for their sliding operation, are rotatably free of one another.

Gear trains

A gear train G₁ is operatively connected to the V drive V₁ while a second gear train G₂ is operatively connected to the drive V₂. The train G¹ comprises a pinion 48 which is drivably mounted on the shaft 17 in any preferred manner such as by being formed integrally therewith and a gear 49 which meshes with the pinion 48 and which is journaled for free rotation about a spindle 50 by bearing assemblies shown at 51. Outstanding from the gear 49 is a hub 52 which carries peripheral gear teeth 53 and radial teeth 54. It is evident that when the gear 49 is clutched to the spindle 50, as will be later described, the drive will be from the motor 10 through the V belt drive V₁ and gear train G₁ to the spindle 50.

The gear train G₂, which is intended to provide a different and higher gear ratio so as to drive the spindle 50 at a greater rate of speed than that provided by the train G₁, includes a gear 55 that is drivably carried by the shaft 26 in any preferred manner such as by being formed integrally therewith. Meshing with the gear 55 is a second gear 56 which is journaled for free rotation about the spindle 50 by the bearing assembly shown at 57. Extending inwardly from the gear 56 is a hub 58 formed with peripheral gear teeth 59. A further inward extension provides a clutch sleeve 60. This clutch sleeve 60 is spaced from the spindle 50 and carries inwardly extending clutch plates in the form of rings 61.

It is evident that when the gear 56 is clutched to the spindle 50 the drive will be from the motor 10 through the drive V₂ and gear train G₂ to the spindle 50.

It is evident from the foregoing that it is necessary that either the gear 49 or the gear 56 be clutched to the spindle 50. This is accomplished by the clutch mechanism now to be described. A clutch member 62 is slidably mounted over the spindle 50 and is drivably connected thereto such as by the splines shown at 63. Clutch member 62 has radial teeth 64 which are adapted to engage the teeth 54 on the hub 52 of the gear 49. Clutch member 62 is formed with an annular groove 65 for a purpose to be later described. Another clutch element 66 is splined to the spindle 50 as indicated at 67 and is slidable along the spindle but in driving relation with respect thereto. This clutch member 66 carries a sleeve 68 which projects into the clutch extension 60. This sleeve 68 carries outwardly extending plates in the form of rings 69 which are interposed between the plates 61 carried by the clutch extension 60. Clutch element 66 is also formed with an annular groove 70 for a purpose to be later described.

An expansion spring 72 is coiled about the spindle 50 and interposed between the clutch elements 62 and 66.

Clutch shifting mechanism

A rod 72 is mounted for sliding movement in the supporting structure in any preferred manner (not illustrated). This rod 72 carries a roller 73 that is received in the groove 65 of the clutch member 62 and a second roller 74 that is received in the groove 70 of the clutch element 66. It is evident that as this rod 72 is shifted in a lateral direction substantially parallel to the axis of the spindle 50 the clutch elements 62 and 66 will be correspondingly moved.

In order to cause this lateral shifting of the rod 72 a clutch actuator motor 75 is provided. The motor 75 drives a screw stem 76 which is threaded through a traveling nut 77. A lever 78 which is pivotally mounted, as indicated at 79, has one end received in a notch 80 formed in the nut 77 and its opposite end fitted in a notch 81 formed in the rod 72. Thus, as the motor is rotated the screw stem 76 is rotated, the nut 77 moved in one direction, and this movement transmitted into a shifting of the rod 72 in the opposite direction by the lever 78.

It is notable that when the clutch member 62 is shifted to cause the teeth 64 and 54 to engage and establish the driving relation between the gear 49 and spindle 50 the clutch member 66 is moved in the same direction and the clutch plate 69 disengaged from the clutch plate 61. Conversely, when the clutch member 66 is moved to engage the plates 69 and 61, the teeth 64 and 54 are disengaged. The spring 71 provides a certain degree of cushioning effect between the clutch members 62 and 66.

Actuator motors control

An essential feature in the operation of the present transmission is that when the speed of operation is being changed and synchronous speed is attained the direction of operation of the actuator motors 47 and 75 will be automatically reversed. This automatic operation is achieved by control mechanism now to be described. A shaft 82 has its opposite ends journaled in the supporting framework by bearing assemblies 83 and 84. A hub 85 is mounted for free rotation about the shaft 82 by the bearing assemblies shown at 86. This hub 85 carries a gear 87 that meshes with the peripheral gear teeth 53 on the hub 52. The inner face of the gear 87 carries a hump 88 presenting oppositely inclined cam faces 89 and 90. A spring retainer 91 is associated with the cam face 89 and another spring retainer 92 is associated with the cam face 90. The purpose of these spring retainers will be later described.

Drivably mounted on the shaft 82 is a gear 93 that meshes with the gear teeth 59 on the hub 58. A sleeve 94 is drivably and slidably mounted on the shaft 82 such as by being splined thereon. This sleeve 94 at its inner end carries a pressure plate 95 which is disposed opposite to the gear 87. A ball 96 is interposed between the inner face of this pressure plate 95 and one of the cam faces 89 or 90 and is confined by one of the retaining springs 91 or 92. An expansion spring 97 is disposed about the shaft 82 and interposed between the gear 93 and sleeve 94. The expansive force of this spring normally urges the sleeve 94 and pressure plate 95 towards the gear 87.

The sleeve 94 is formed with an annular groove 98. One side of a lever is defined by a yoke 99 which carries at its free ends a pair of spaced rollers 100 which are received in the groove 98. The other side of a lever consists of an arm 101. The lever is pivotally mounted as indicated at 102 on the supporting structure. A ratchet type switch is represented at 103 and includes an operating arm at 104. A link 105 is pivotally connected at one end to the arm 104 as indicated at 106 and at its other end to the lever arm 101 as indicated at 107.

At this point, it is sufficient to note that the switch 103 is effective to control the direction of rotation of the actuator motors 47 and 75. Moreover, movement of the sleeve 94 outwardly or to the right (speaking with reference to the showing of the drawings) will shift the yoke 99 so as to swing the lever and cause its arm 101 to move the link 105 inwardly or to the left and thereby actuate the switch 103 to cause a change in the direction of operation of the actuator motors.

This shifting of the sleeve 94 is caused by the cam action of the ball 96 and one of the cam surfaces 89 or 90 of the hump 88. There is a difference in the gear ratios afforded by the train 53—87 on one hand and the train 59—93 on the other. While the gear train G1 is effective over the lower half of the speed range, the gear 93 will be rotated at a higher rate of speed than the gear 87. When this condition obtains, the only result is that the ball 96 tends to ride down off the inclined surface 89 but is held in position by the retainer 91.

But as synchronous speed is approached, the gear 87 gradually overtakes the pressure plate 95 and in so overtaking it the cam surface 89 of the hump 88 is rendered effective to force the ball outwardly or to the right and thereby move the sleeve 94 outwardly or to the right against the influence of the spring 97. This action is continued until the ball 96 rides over the hump but in so riding the sleeve 94 will have been shifted sufficiently far to actuate the switch and cause a reversal in the direction of operation of the motors 47 and 75.

With the gear train G2 effective during the high speed half of the range, the difference in the speed of rotations imparted to the gears 87 and 93 will merely cause the ball 96 to tend to ride off the cam surface 90 against which it now engages. However, as synchronous speed is again approached, the plate 90 will move relative to the plate 87 so as to cause the ball to ride up the inclined surface 90 and over the hump to again shift the sleeve 94 and actuate the switch.

Figure 7:
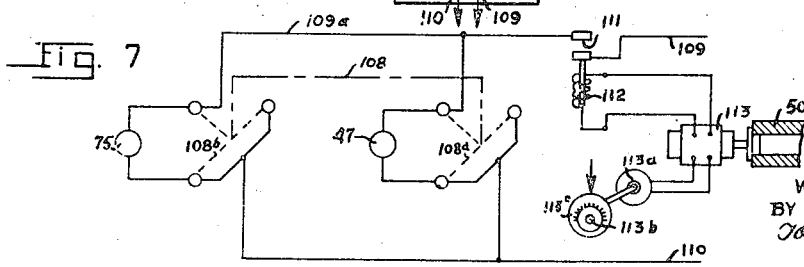
Figure 7 is a diagrammatic view consisting mostly of a wiring diagram and developing the interrelation between the motors which control the adjustment of the transmission.

Figure 7 shows the electrical control switch mechanism for reversing and rendering the motors 47 and 75 inoperative. Each motor 47 and 75 is respectively provided with reversing switch contacts 108a and 108b carried on the common actuating shaft 108 of the switch 103 so as to reversably apply current from leads 109a and 110 to the motors when the switch 103 is operated as described. A solenoid switch 111 having a coil 112 connected to a tachometer control generator 113 driven by a spindle 50 serves to disconnect the power supply lead 109 from lead 109a to arrest operation of motors 47 and 75 when the spindle 50 has reached the desired operating speed. Any conventional control may be provided for the tachometer generator, such as the electrical control element 113a regulated by a control knob 113b having suitable graduations 113c indicating the speeds to be selected for the spindle 50.

*Operation*

While the operation of the above described mechanism is believed to be evident from the description already given, it may be outlined as follows.

The operator first sets the tachometer control knob 113b for the speed of operation which is desired for the spindle 50, say, for instance, 800 R. P. M. The motor 10 is now started in operation and the circuits to the motors 47 and 75 completed by closing switch 111. The latter will remain in operation until the desired speed of rotation of the spindle 50 is reached, whereupon the tachometer control becomes effective to open the switch 111 and interrupt the circuit to the motors 47 and 75. The circuit to these motors is not again completed until a further change in the speed of rotation of the spindle 50 is desired.

Referring now more particularly to Figure 3, it will be noted that this view depicts the condition of the drives $V_1$ and $V_2$ when either the lowest speed possible or the highest speed possible obtains. As the drive $V_1$ is rendered effective by clutching in of the gear train $G_1$, then the spindle 50 will be driven at its minimum speed. On the other hand, if the drive $V_2$ is effective by clutching in the gear train $G_2$ in the condition shown in Figure 3, the spindle 50 is driven at its maximum speed. Figure 2 represents the condition of the drives $V_1$ and $V_2$ at synchronous speed. This means the drive $V_1$ is being driven at its maximum speed and the drive $V_2$ at its minimum with the two substantially completed.

Figure 4:
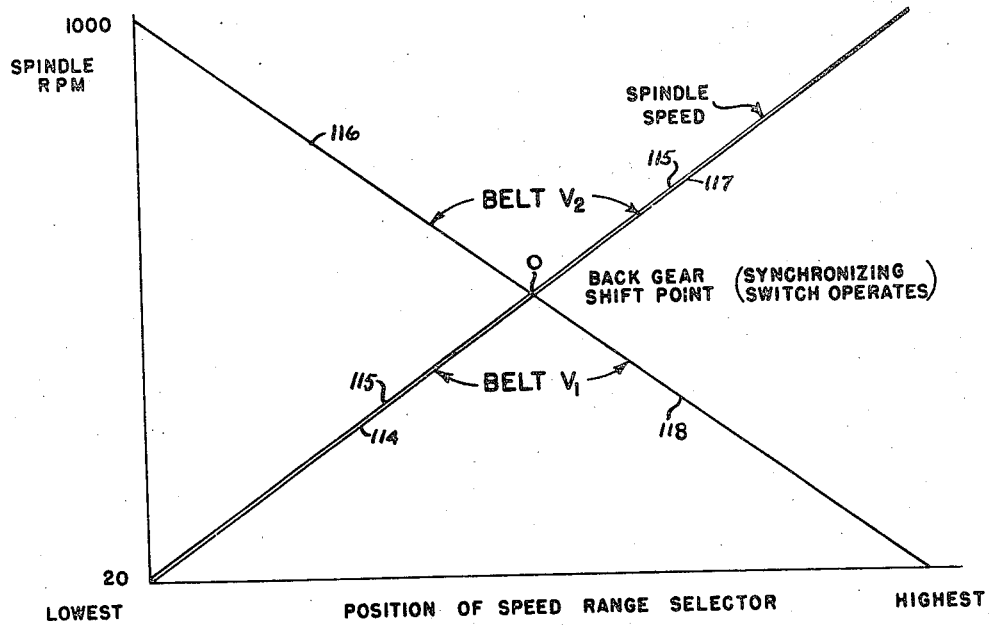
Figure 4 is a graphical representation of the relation of the V belt drives over the entire range.
Figure 5:
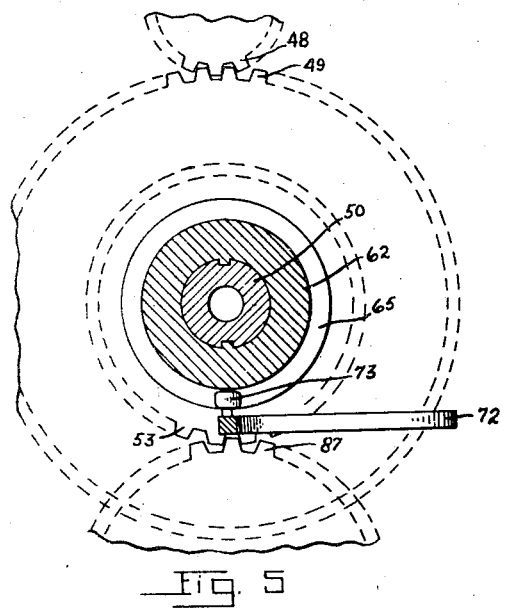
Figure 5 is an enlarged detailed sectional view through the clutch mechanism being taken about on the plane represented by line 5—5 of Figure 1.
Figure 6:
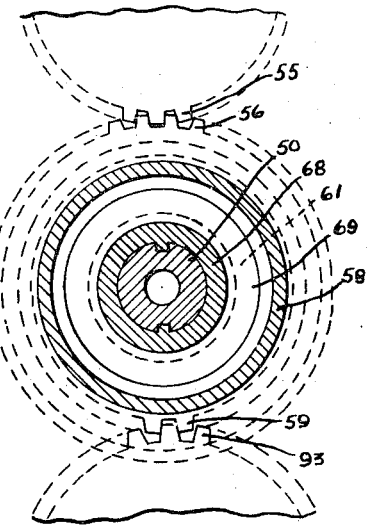
Figure 6 is another enlarged detailed sectional view taken about on the plane represented by line 6—6 of Figure 1.

Bearing the disclosures of these figures in mind, attention is called to the graphical representation of Figure 4. The line 114 represents the speed of the drive $V_1$ as it increases from its minimum to its maximum. Over this range, the line 114 coincides with the speed of rotation of the spindle 50 which is represented at 115. The line 116 represents the speed of the drive $V_2$ as it decreases from its maximum to its minimum while the gear train $G_2$ is ineffective. It is notable that during this condition there is nothing common between the line 116 and the spindle speed line 115. The point where the minimum speed of the drive $V_2$ equals the maximum speed of the drive $V_1$ is represented at O. Beginning with the point O, the drive $V_2$ becomes effective and begins to increase, this being represented by the line 117. At the same time, the drive $V_1$ is ineffective and begins to decrease, this being represented by the line 118. It is notable that the spindle speed line 115 is coextensive with the line 117 representing the increase in the speed of the drive V₂ when the latter is effective.

Let us assume that the transmission is in the condition depicted in Figure 3 and the gear train G₁ clutched into the spindle 50 by engagement of the teeth 64 and 54. As it is desired to increase the speed to some point in the upper half of the speed range, the tachometer control will be adjusted to the desired point. This starts the actuator motors 47 and 75 into operation. As the motor 47 is driven, it in turn shifts the sheave halves 22 and 31 so as to increase the cross-sectional area of the sheave 20—22 and decrease the cross-sectional area of the sheave 29—31. This change takes place gradually until the condition of synchronous speed represented at Figure 2 is reached. At this point, the sheave 20—22 will be rotating at its maximum speed and the sheave 29—31 at its minimum speed. When this condition is achieved, the actuator control above described is effective to actuate the switch 103 and reverse the direction of rotation of the motors. However, immediately before this takes place, the rod 72 will have been shifted sufficiently to clutch in the gear train G₂ and disengage the gear train G₁. The high speed gear ratio now obtains and the speed of operation of the spindle continues to increase because the cross-sectional area of the sheave 29—31 now increases at the same time as the cross-sectional area of the sheave 20—22 decreases. When the point at which the tachometer control has been set is reached, the solenoid 112 opens the switch 111 and the operation of the actuator motors is discontinued. The spindle is now driven from the motor 10 at the desired speed through the drive V₂ and gear train G₂.

Should it be desired to rotate the spindle at a speed in the lower half of the range, the tachometer control is set for that speed and this closes the switch 111. The actuator motors are now again brought into operation and substantially the same sequence above described takes place but in the opposite direction. The important factor is that when synchronous speed is reached, the clutch is shifted and the direction of rotation of the actuator motors reversed.

While a preferred specific embodiment of the invention is hereinbefore set forth, it is to be clearly understood that the invention is not to be limited to the exact construction illustrated and described because various modifications of these details may be provided in putting the invention into practice within the purview of the appended claims.

What is claimed is:

1. A variable speed transmission having one adjustable drive capable of affording speed variations over a predetermined range, and a second drive adjustable to afford speed variations over a higher range, wherein the maximum speed of said first drive is substantially the same as the minimum speed of said second drive, a spindle to be driven, a pair of gear trains of different ratios, one of said gear trains being operatively connected to said first drive and the other being operatively connected to said second drive, means for clutching one of said gear trains to said spindle to the exclusion of the other gear train, means for simultaneously adjusting said drives whereby as the speed of one drive increases the speed of the other drive decreases and vice versa, and control mechanism for automatically selectively clutching either of said gear trains to said spindle when said drives attain substantially the same speed.

2. A variable speed transmission having one adjustable V belt drive capable of affording speed variations over a predetermined range, and a second V belt drive adjustable to afford speed variations over a higher range, wherein the maximum speed of said first drive is substantially the same as the minimum speed of said second drive, a spindle to be driven, a pair of gear trains of different ratios, one of said gear trains being operatively connected to said first drive and the other being operatively connected to said second drive, means for clutching one of said gear trains to said spindle to the exclusion of the other gear train, means for simultaneously adjusting said drives whereby as the speed of one drive increases the speed of the other drive decreases and vice versa, and control mechanism for automatically selectively clutching either of said gear trains to said spindle when said drives attain substantially the same speed.

3. A variable speed transmission having one V belt drive including a sheave of adjustable cross-section and adapted to afford speed variations over a predetermined range and a second V belt drive including a sheave of adjustable cross-section and adapted to afford speed variations over a higher range so that the maximum speed of operation afforded by said first drive is substantially the same as the minimum speed afforded by said second drive, including mechanism comprising a source of power common to said drives, a spindle to be driven from said source of power, a low speed gear train operatively connected to said first drive and including a gear freely rotatable on said spindle, a high speed gear train operatively connected to said second drive and including a gear freely rotatable on said spindle, a clutch member drivably mounted on said spindle and slidable therealong, said clutch member being adapted to clutch one of said gears to said spindle to the exclusion of the other of said gears, mechanism for adjusting the cross-sections of said sheaves, mechanism for shifting said clutch member, and means for automatically interrelating the operation of said mechanisms whereby said clutch is shifted when said adjustable drives attain synchronous speed.

4. A variable speed transmission having one V belt drive including a sheave of adjustable cross-section and adapted to afford speed variations over a predetermined range and a second V belt drive including a sheave of adjustable cross-section and adapted to afford speed variations over a higher range so that the maximum speed of operation afforded by said first drive is substantially the same as the minimum speed afforded by said second drive, including mechanism comprising a source of power common to said drives, a spindle to be driven from said source of power, a low speed gear train operatively connected to said first drive and including a gear freely rotatable on said spindle, a high speed gear train operatively connected to said second drive and including a gear freely rotatable on said spindle, a clutch member drivably mounted on said spindle and slidable therealong, said clutch member being adapted to clutch one of said gears to said spindle to the exclusion of the other of said gears, mechanism for simultaneously adjusting the cross-section of said sheaves so that as the cross-section of one sheave increases the cross-section of the other sheave decreases, an actuator motor for said mechanism, mechanism for shifting said clutch, an actuator motor for said clutch shifting mechanism, and automatic control means for said motors for causing said motors to reverse their direction of rotation upon the attainment of synchronous speed by said drives.

5. In a variable speed transmission, a belt drive friction transmission including a pair of V-groove sheaves of adjustable cross-section, mechanism for simultaneously adjusting said sheaves so that as the V-groove cross-section of one increases the other decreases and vice versa, V-belt means operating in said grooves, an actuator motor for said mechanism, a pair of gear trains of different ratios, each of said trains being operatively connected to one of said sheaves, a power source for driving said sheaves, a spindle adapted to be driven by said gear train, a clutch adapted to clutch one or the other of said gear trains to said spindle, mechanism for shifting said clutch, an actuator motor for the last said mechanism, and means for automatically reversing the direction of operation of said motors when a condition of synchronous speed is imparted to said gear trains by said sheaves.

6. In a variable speed transmission, a variable speed drive having a range from minimum to maximum speeds, a second variable speed drive having a range higher than the range of said first drive and with the minimum speed substantially equal to the maximum speed of said first drive, a spindle to be driven, means for selectively driving said spindle from one or the other of said drives, means for simultaneously adjusting said drives to cause the speed provided by one drive to increase at the same time the speed of the other drive decreases and vice versa, and control means for automatically connecting said selective driving means to said spindle when said drives reach a speed of synchronous operation.

7. In a variable speed transmission, a low speed V belt drive having a range from minimum to maximum speeds, a high speed V belt drive having a range higher than the range of said low speed drive and with the minimum speed substantially equal to the maximum speed of said low speed drive, a spindle to be driven, means for selectively driving said spindle from one or the other of said drives, means for simultaneously adjusting said drives to cause the speed provided by one drive to increase at the same time the speed of the other drive decreases and vice versa, and control means for automatically connecting said selective driving means to said spindle when said drives reach a speed of synchronous operation.

8. In a variable speed transmission, a source of power, a pair of gear trains of different ratios, a pair of adjustable V belt drives each operatively connecting said power source with one of said gear trains, a spindle to be driven, a gear in each train mounted for free rotation on said spindle, a clutch assembly on said spindle between said gears and movable to operatively engage one gear to the exclusion of the other, and means to shift said clutch assembly.

9. In a variable speed transmission, a source of power, a pair of gear trains of different ratios, a pair of adjustable V belt drives each operatively connecting said power source with one of said gear trains, a spindle to be driven, a gear in each train mounted for free rotation on said spindle, a clutch assembly on said spindle between said gears and movable to operatively engage one gear to the exclusion of the other, means to shift said clutch assembly, said means comprising a rod laterally movable in a direction substantially parallel to said spindle, a connection between said rod and said clutch assembly, and means to move said rod in either direction under power.

10. In a variable speed transmission, a source of power, a pair of gear trains of different ratios, a pair of adjustable V belt drives each operatively connecting said power source with one of said gear trains, a spindle to be driven, a gear in each train mounted for free rotation on said spindle and in speed relation, a clutch assembly on said spindle between said gears and movable to operatively engage one gear to the exclusion of the other, means to shift said clutch assembly, said means comprising a rod laterally movable in a direction substantially parallel to said spindle, a connection between said rod and said clutch assembly, a lever having one end operatively connected to said rod, a nut operatively connected to the other end of said lever, a screw stem passing through said nut, and an actuator motor for said screw stem.

11. In a variable speed transmission, the combination of: a pair of variable speed drives having overlapping output speed rates, an actuator motor for adjusting said drives to vary the speed thereof, a pair of gear trains operatively connected to said drives, a clutch assembly adapted to render either of said gear trains effective, an actuator motor for said clutch assembly, and means for automatically reversing the direction of operation of said motors when said gear trains are at synchronous speed.

12. In a variable speed transmission, the combination of: a pair of variable speed drives, an actuator motor for adjusting said drives to vary the speed thereof, a pair of gear trains operatively connected to said drives, a clutch assembly adapted to render either of said gear trains effective, an actuator motor for said clutch assembly, a switch controlling the direction of operation of said motors, and switch operating mechanism operatively connected to said gear trains and operable thereby when said trains reach a condition of synchrony in their driven speeds to operate said switch and reverse the direction of rotation of said motors.

13. In a variable speed transmission, a power input member, a driven member, a pair of infinitely variable speed drives between said input member and said driven member, speed varying means for oppositely varying the rate of speed of each of said drives between a predetermined maximum and minimum output speed, means for alternately connecting one or the other of said drives to said driven member, and ratio changing means to adjust said last mentioned means so that the maximum output speed to said driven member from one of said drives is substantially the same as the minimum output speed of said other drive to said driven member.

14. In a variable speed transmission, a power input member, a driven member, a pair of infinitely variable speed drives between said input member and said driven member, speed varying means for oppositely varying the rate of speed of each of said drives between a predetermined maximum and minimum output speed, means for alternately connecting one or the other of said drives to said driven member, ratio changing means to adjust said last mentioned means so that the maximum output speed to said driven member from one of said drives is substantially the same as the minimum output speed of said other drive to said driven member, power means for actuating said speed varying means and said ratio changing means for oppositely varying the rates of said drives and alternately connecting one or the other of said drives to the driven member, and control means responsive to a predetermined rate of operation of said driven member to render said power means inoperative so as to maintain said predetermined rate of operation for said driven member.

15. In a variable speed transmission, a power input member, a driven member, a pair of infinitely variable speed drives between said input member and said driven member, speed varying means for oppositely varying the rate of speed of said drives between a predetermined maximum and minimum output speed, means for alternately connecting one or the other of said drives to said driven member, ratio changing means to adjust each of said last-mentioned means so that the maximum output speed to said driven member from one of said drives is substantially the same as the minimum output speed of said other drive to said driven member, power means for actuating said speed varying means and said ratio changing means for oppositely varying the rates of said drives and alternately connecting one or the other of said drives to the driven member, control means responsive to a predetermined rate of operation of said driven member to render said power means inoperative so as to maintain said predetermined rate of operation for said driven member, and manual selector means operable to adjust said control means for any desired predetermined rate of operation of said driven member.

16. In a variable speed transmission, a power input member, a driven member, a pair of infinitely variable speed drives between said input and said driven member, speed varying means for oppositely varying the rate of speed of said drives between a predetermined maximum and minimum output speed, means for alternately connecting one or the other of said drives to said driven member, ratio changing means to adjust said last mentioned means so that the maximum output speed to said driven member from one of said drives is substantially the same as the minimum output speed of said other drive to said driven member, power means for actuating said speed varying means for oppositely varying the rates of said drives, power means for actuating said ratio changing means for alternately connecting one or the other of said drives to the driven member, and means responsive to the relative rates of output of both of said drives to reversably control both of said power means.

17. In a variable speed transmission, a power input member, a driven member, a pair of infinitely variable speed drives between said input member and said driven member, speed varying means for oppositely varying the rate of speed of said drives between a predetermined maximum and minimum output speed, means for alternately connecting one or the other of said drives to said driven member, ratio changing means to adjust said last mentioned means so that the maximum output speed to said driven member from one of said drives is substantially the same as the minimum output speed of said other drive to said driven member, power means for actuating said speed varying means for oppositely varying the rates of said drives, power means for actuating said ratio changing means for alternately connecting one or the other of said drives to the driven member, means responsive to the relative rates of output of both of said drives to reversably control both of said power means, and means responsive to the rate of operation of said driven member to maintain said power means inoperative at a predetermined desired speed of operation of said driven member.

WILLIAM B. DULANEY.

REFERENCES CITED

The following references are of record in the file of this patent:

UNITED STATES PATENTS

| Number | Name | Date |
| --- | --- | --- |
| 273,329 | Weston | Mar. 6, 1883 |
| 1,031,988 | Draullette | July 9, 1912 |
| 1,143,048 | Hunt | June 15, 1915 |
| 1,837,923 | Quinn | Dec. 22, 1931 |
| 2,031,712 | Jannin | Feb. 25, 1936 |
| 2,271,598 | Maurer | Feb. 3, 1942 |
| 2,280,182 | Zupan | Apr. 21, 1942 |
| 2,308,090 | MacFanen | Jan. 12, 1943 |
| 2,389,757 | Bickel | Nov. 27, 1945 |
| 2,413,274 | Wilkie | Dec. 24, 1946 |
| 2,448,450 | Maxson et al. | Aug. 31, 1948 |